Nov. 3, 1970 R. A. SIMON 3,537,834
MAINTAINING SHEET GLASS WIDTH
Filed Aug. 7, 1968 2 Sheets-Sheet 1

INVENTOR.
Raphael A. Simon
BY Burton R. Turner
ATTORNEY

3,537,834
MAINTAINING SHEET GLASS WIDTH

Raphael A. Simon, Corning, N.Y., assignor to Corning Glass Works, Corning, N.Y., a corporation of New York
Continuation-in-part of application Ser. No. 539,903, Apr. 4, 1966. This application Aug. 7, 1968, Ser. No. 750,907
The portion of the term of the patent subsequent to June 24, 1986, has been disclaimed
Int. Cl. C03b 15/02
U.S. Cl. 65—199     6 Claims

ABSTRACT OF THE DISCLOSURE

In the formation of sheet glass by the overflow-down draw process, the width of usable sheet glass is maximized by downwardly flowing edge portions of the sheet over web-like members which project below the root of the forming member, with an arcuate portion thereof terminating in the vertical plane passing through the longitudinal axis of said root, to thin edge portions of the glass flow and maintain sheet width.

CROSS-REFERENCE TO RELATED APPLICATION

The present application is a continuation-in-part of the invention disclosed in my copending patent application Ser. No. 539,903, filed Apr. 4, 1966, for sheet glass edge control, now Pat. No. 3,451,798.

BACKGROUND OF THE INVENTION

The manufacture of sheet glass by downwardly flowing molten glass over a forming wedge is well known in the art. However, in practice it was found that the actual width of usable sheet produced was substantially less than the maximum width of usable glass sheet which theoretically could be obtained, as predicated by the longitudial length of the forming wedge. That is, it has been found that when the molten glass flows along the underside of a negatively inclined surface, such as the downwardly converging surfaces of a forming wedge, the width of the glass stream contracts and pulls inwardly from the vertical ends of the wedge.

This lateral movement of the molten glass produces a bead or thickening portion along the edge of the sheet. The thickened sections on the edges of the sheet not only decrease the amount of usable uniform thickness sheet glass that can be obtained from a given width of drawn sheet, but also limit the speed at which the sheet may be drawn. That is, since the sheet is annealed as a continuous process immediately after formation, and the time required for sheet glass to reach an acceptable strain level in passing through the annealing portion of the process is directly proportional to the thickness of the glass, sheet having thickened edge portions requires more annealing time, thus limiting the maximum rate of sheet formation.

In the past it has been suggested that the narrowing of the width of glass sheet formed by the downdraw process may be prevented by utilizing rollers or edge cooling. However, this has not been entirely satisfactory since rolling merely attempts to reduce the thickness of the beaded portion without attempting to correct the cause or source of the bead, and cooling tends to enlarge the formation of beaded edges, which as previously indicated are detrimental in the formation of sheet glass. Further, I have found that high viscosities adjacent the edges of the sheet flow actually tend to create a pull-in or narrowing of the glass to a much greater extent than do low viscosities. However, should the edges be chilled sufficiently to set up the glass, additional detrimental effects are produced in the form of sheet warpage and undesirable stresses.

The method and apparatus disclosed in my aforementioned copending patent application Ser. No. 539,903, presented a definite advance over the prior art in helping to solve these problems by functioning to maintain sheet width and minimize edge bead. However, when the negative or reverse angle of the forming wedge is increased so that the sides converge more rapidly, for example from a 30° included angle to a 40° included angle, the filleted or web portion of the edge director must necessarily be of a larger radius to accommodate the increased reverse slope. Accordingly, the filleted portion of my prior edge directors necessarily intersected the root of the forming member at a considerable distance from its vertical edge. This produced an excessive width of separated sheet along each end of the root, which required subsequent lamination below the apex or root of the forming member. However, due to air entrapment, surface filming, etc., such subsequently laminated sheet is not usable as that formed by fusing the converging flows along the root.

SUMMARY OF THE INVENTION

The present invention virtually obviates the problems of reduction in sheet width and bead formation heretofore encountered when forming sheet glass by an overflow-downdraw process, and particularly where the reverse slope or negative angle of the forming wedge is greater than 15°, by providing the forming wedge with edge director projections having web portions which converge below the bottom of the forming wedge in a vertical plane extending through the root of such wedge.

Each edge director has a projecting edge surface portion which extends along edge portions of the forming surface of the wedge, and a web or filleted portion which extends between such projecting edge portion and an adjacent downwardly inclined forming surface portion. In order to provide greater usable sheet glass width, bottom edge portions of a pair of opposed web portions converge below the root of the forming member within a vertical plane passing through such root, so as to provide an extended continuous draw line with the root or apex of the forming member.

The web or fillet portion of each edge director provides a wetted length in the horizontal direction which is greater than the horizontal length of the negative-angle wedge surface which it intercepts, and accordingly spreads out the flowing glass and decreases its thickness adjacent to its ends before the glass is drawn off the lower edge thereof to inhibit bead formation. The downwardly-extending converging portions of the edge directors not only provide an extended draw line for fusing opposed flows in order to maximize usable sheet width, but also the line of intersection formed by the converging web portions along the vertical plane is preferably arcuately concave so as to provide an outward pulling effect on the downwardly flowing sheet.

It thus has been an object of the present invention to eliminate the problems of narrowing and edge beading heretofore encountered in the downdraw manufacture of sheet glass.

BRIEF DESCRIPTION OF THE DRAWINGS

FIG. 3 is a fragmental perspective view illustrating a further embodiment of an edge director positioned on a single-end feed overflow trough or forming wedge, of the type shown in FIG. 1, wherein the lower edge of the web portion terminates at its outer end below the horizontal plane passing through the root of the forming wedge.

DESCRIPTION OF THE PREFERRED EMBODIMENTS

Figure 2:
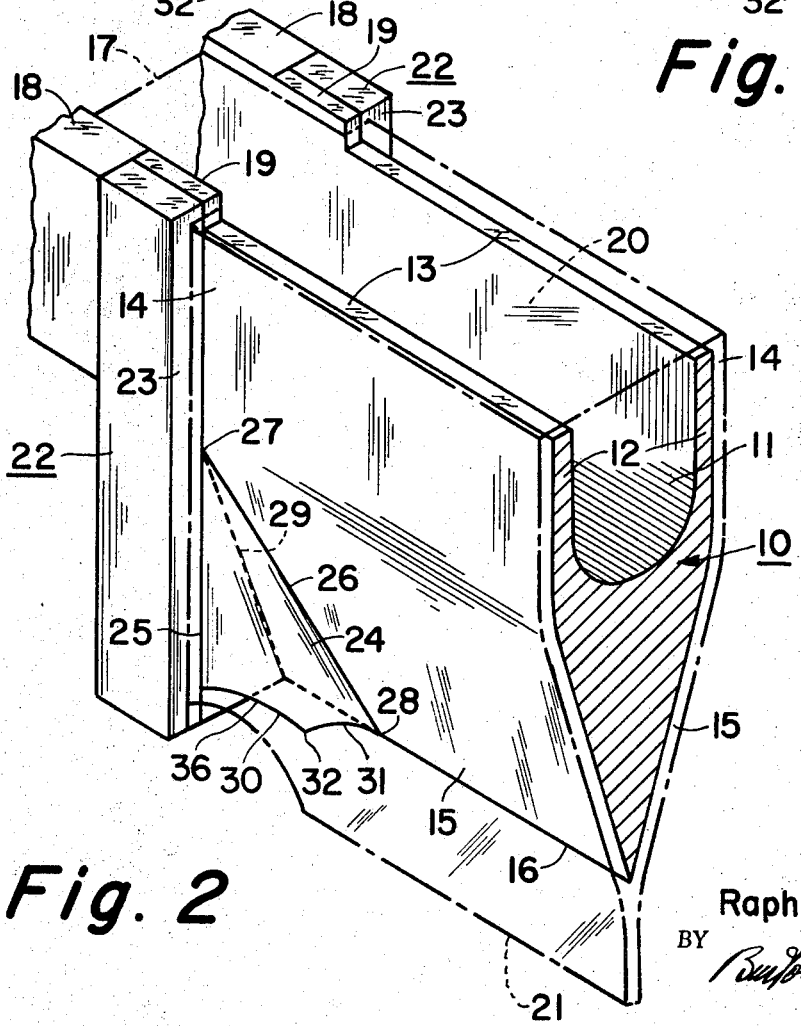
Figure 3:
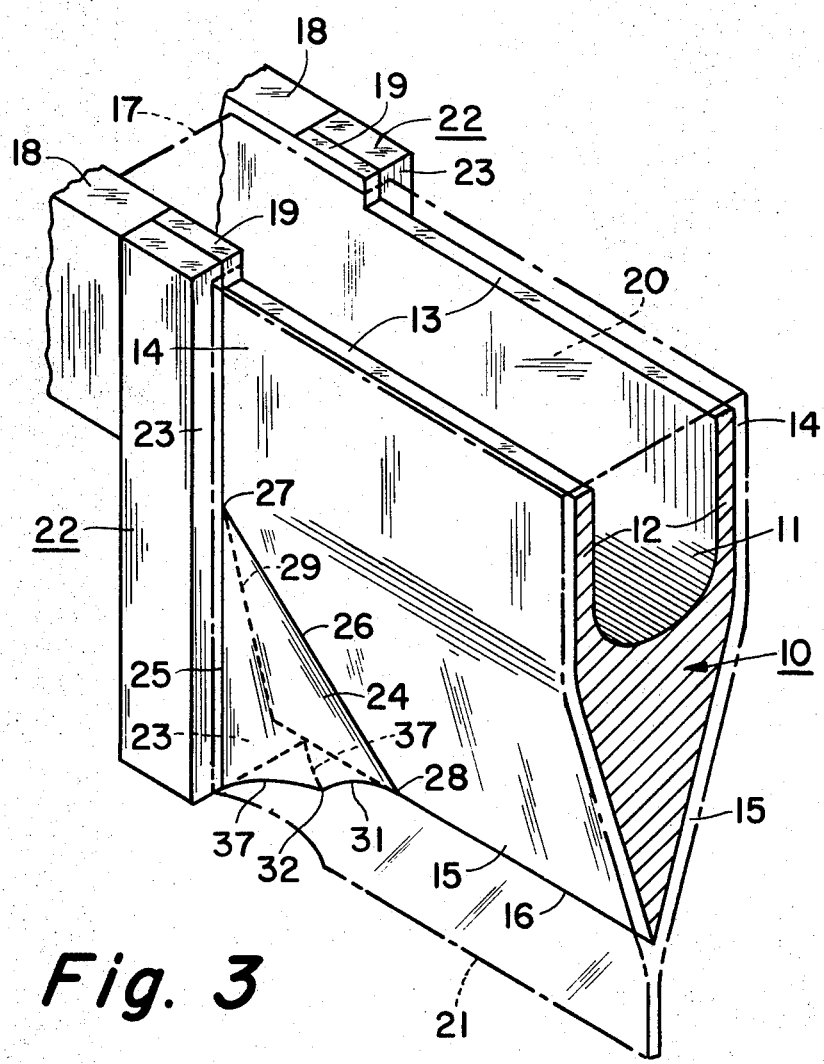
FIG. 3 is a fragmental perspective view illustrating a additional embodiment of an edge director positioned on a single-end overflow trough or forming wedge of the type shown in FIG. 1, wherein the bottom edge of the web portion terminates at its outer end at an elevation above the horizontal plane passing through the root of the forming wedge.

Referring now to the drawings, an overflow trough member of forming wedge 10 is shown having an upwardly open channel 11 bounded on its longitudinal sides by wall portions 12, which terminate at their upper extent in opposed longitudinally-extending overflow weirs or lips 13. The weirs or lips 13 communicate with opposed outer sheet forming surfaces of the wedge member 10. As shown, the wedge member illustrated in FIGS. 1 through 3 is provided with a pair of substantially vertical forming surface portions 14 which communicate with the lips 13, and a pair of downwardly inclined converging surface portions 15 which terminate at a substantially horizontal lower apex or root 16 forming a straight glass draw line.

Molten glass 17 is fed into the channel 11 by means of a delivery passage 18 communicating with the channel 11. The feed into channel 11 may be single ended or, if desired, double ended as shown in FIG. 1. A pair of restricting dams 19 are provided above the overflow lips 13 adjacent each end of the channel 11 to direct the overflow of the free surface 20 of the molten glass 17 over the overflow lips 13 as separate streams, and down the opposed forming surface portions 14, 15 to the apex 16 where the separate streams, shown in chain lines, converge to form a sheet of virgin-surfaced glass 21.

Figure 1:
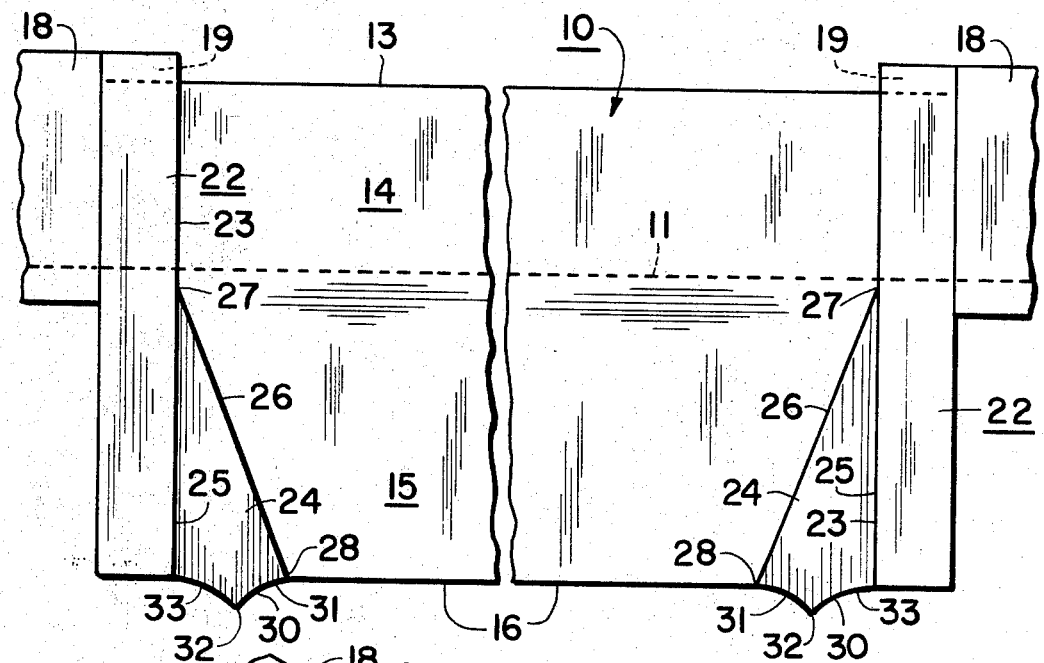
FIG. 1 is an elevational view of a forming wedge provided with edge director projections embodying the present invention.

As shown in FIG. 1, a pair of edge directors or correctors 22 are provided on each side of the forming wedge 10 so that one extends along the vertical edge of each longitudinal end of the wedge. Accordingly, four edge directors are provided for each forming wedge, with one at each vertical corner so that two such edge directors are oppositely disposed at each longitudinal end of the forming wedge. The edge directors 22 are composed of two main portions including a projecting edge surface portion 23 which intersects the forming surface portions of the wedge along their vertical extent, and a web or filleted surface portion 24 which extends between the projecting edge surface portion 23 and one of said downwardly inclined converging surface portions 15.

The web surface portion 24 intersects the edge surface portion 23 along an intersection line 25, and also intersects the inclined forming surface portion 15 along an intersection line 26. The intersection of web or filleted portion 24 with both such surfaces is preferably smoothly rounded or tangential to insure glass-to-surface contact and avoid air pockets and streaking. In addition, the intersection 26 extends from a point 27 where the top of the downwardly inclined forming surface intersects the projecting edge surface portion 23, diagonally downwardly to a point 28 along the root or apex of the forming wedge, which is spaced inwardly from the projecting edge surface portion. In view of the fact that each of the four edge directors utilized with a particular forming wedge will be identical, only one such edge director will be described with regard to each embodiment thereof.

Although the web portions 24 of the disclosed edge directors are shown having a curvilinear or frusto-conical shape, it will be appreciated that the web portions may also be planar or multiplanar, if desired, so long as the intersection lines 25 and 26 are substantially tangential with the surfaces 23 and 15, respectively. The edge directors may be formed from cast refractory or suitable refractory metal compositions, such as stainless steel, platinum, platinum-rhodium alloys, or other high temperature alloys.

The various embodiments of the edge directors all operate in virtually the same principle to produce a maximum width glass sheet having a minimum amount of edge head. The edge directors provide an attachment projecting edge surface 23 for the edge portions of the molten glass flowing along the forming wedge, and a web portion 24 for maintaining a flow of the molten glass adjacent such edge surface portion.

Molten glass flowing downwardly along edge portions of the converging forming surfaces is intercepted by the web surfaces along their diagonal lines of intersection with the inclined forming surfaces. Edge portions of the downwardly flowing sheet are first guidably supported by the inclined forming surfaces, and then by the web surface portions 24 of the edge directors 22. The outer web portions function to maintain a full-width and substantially vertical flow down to the elevation of the bottom outer edge of the web portion. The diverging outer edge portions of opposed web portions thin and separate the edge flows, as central portions continue to converge along the common draw line formed by inner edge portions 31 and root 16.

The contour of the web surface portion provides a wetted length, which in a horizontal direction is greater than the length of the forming surface which it intercepts, and accordingly spreads out or thins the glass flowing thereover, thus actually decreasing the thickness of the longitudinal edges of the molten glass stream before it leaves the bottom edge of the web portion. As the molten glass flows off the bottom edge of the separate opposed web portions, the inherent drawing tension effect which normally decreases sheet width and thickens the edges, now brings the thickness of such free flows back to their normal value as they unite below the root or glass drawing line of the wedge. Accordingly, edge bead is virtually eliminated, while maximum sheet width of uniform thickness is obtained. Further, the curvilinear draw line extensions formed by downwardly curved inner edge portions 31 at each end of root 16, produce an outward pulling effect which tends to maintain sheet width.

The edge directors disclosed in my previously mentioned co-pending application have been very successful in maintaining or maximizing sheet width while minimizing edge bead when forming glass by the overflow-downdraw process with a forming wedge having a maximum negative angle or reverse slope of 15°. However, when producing glass by such process with a forming wedge having a reverse slope or negative angle greater than 15°, improved results are obtained by utilizing the present invention. That is, since the inclined surfaces of the forming wedge having an increase negative slope converge more rapidly, a larger web or filleted radius was required to contact adjoining surfaces, thus reducing the width of the root draw line and increasing the length of the diverging web portions. Accordingly, by utilizing the present invention it was possible to actually increase the effective draw line and maximize sheet width by extending opposed filleted portions below the root of the forming member and converging edge portions thereof along a common draw line.

As a practical illustration, it has been found that when forming sheet over a forming member having a length of 76¾ inches with glass having a temperature of 1190° and viscosity 3500 poises at a flow rate of 1400 pounds per hour, sheet width is actually increased by 6 inches over that width produced under similar conditions but utilizing the edge directors of my initial concept.

Although I have disclosed the now preferred embodiments of the invention, it will become apparent to those skilled in the art that various changes and modifications may be made thereto without departing from the spirit and scope thereof.

I claim:
1. Apparatus for downwardly drawing sheet glass which comprises, a forming wedge (10) having a pair of downwardly inclined forming surface portions (15) for flowing molten glass therealong, said downwardly inclined forming surface portions (15) converging at the bottom of said forming wedge (10) forming a root (16) and defining a glass draw line therealong, edge director means (22) extending along vertical edge portions of the said forming surfaces (15), said edge director means (22) having web means (24) communicating with said forming surfaces (15) for intercepting and thinning the flow of glass along edge portions of such forming surfaces, and said web means (24) having a bottom edge (30) extending downwardly below a horizontal plane passing through said root (16) with a portion (31) of said bottom edge lying in a vertical plane passing through said root (16) and forming an effective extension thereto.

2. Apparatus as defined in claim 1 wherein a pair of opposed edge director means (22) are provided on opposite sides of said forming wedge (10) with the bottom edge portion (31) of each which lies within said vertical plane forming a common curvilinear glass draw line extension below the bottom of said forming wedge.

3. Apparatus as defined in claim 1 wherein said edge director means (22) includes an edge surface (23) projecting from one of said forming surfaces (15), and the lower edge (30) of said web means (24) includes a curvilinear inner portion (31) extending downwardly from said root (16) within said vertical plane and an outer lower edge portion (33, 36, 37) communicating from said vertical plane to said projecting edge surface.

4. Apparatus as defined in claim 3 wherein the lower edge (30) of said web means (24) has an outer portion (36) which communicates with said projecting edge surface (23) at an elevation above a horizontal plane passing through the root (16) of said forming wedge (10).

5. Apparatus as defined in claim 3 wherein the lower edge (30) of said web means (24) has an outer portion (37) which communicates with said projecting edge surface (23) at an elevation below a horizontal plane passing through the root (16) of said forming wedge (10).

6. Apparatus as defined in claim 3 wherein the lower edge (30) of said means (24) has an outer portion (33) which communicates with said projecting edge surface (23) at an elevation substantially within a horizontal plane passing through the root (16) of said forming wedge (10).

References Cited

UNITED STATES PATENTS

| | | | |
|---|---|---|---|
| 1,184,996 | 5/1916 | Raspillaire | 65—199 |
| 1,829,641 | 10/1931 | Ferngren | 65—199 XR |
| 3,345,150 | 10/1967 | Ihrig | 65—134 XR |
| 3,451,789 | 6/1969 | Simon | 65—90 XR |

FRANK W. MIGA, Primary Examiner

U.S. Cl. X.R.

65—90, 121, 193, 324

UNITED STATES PATENT OFFICE
CERTIFICATE OF CORRECTION

Patent No. 3,537,834                     Dated November 3, 1970

Inventor(s) Raphael A. Simon

It is certified that error appears in the above-identified patent and that said Letters Patent are hereby corrected as shown below:

Column 2, line 69, "FIG. 3" should read --FIG. 2--. Column 3, the following paragraphs were omitted after line 67 and before line 68:

--Referring now particularly to Figure 1, the lower edge 30 of the web or filleted surface portion 24 extends downwardly below the root 16. An inner portion 31 of the lower edge 30 lies withi a vertical plane passing through the root 16 and is continuous with the root so as to extend the glass draw line outwardly at each end thereof. The inner edge portion 31 of web member 24 forms a common line of intersection or draw line with the inner edge portion of an opposed web portion 24 on the opposite side of the forming member 10, since both inner edge portions 31 lie in the same vertical plane passing through the root 16. Such inner edge portions 31 preferably form a common curvilinear line extending downwardly from the root 16 to a lower most point 32 within the vertical plane passing through the root. At this point the lower edges 30 of the opposed web portions 24 then separate and divergently flare outwardly along outer edge portions 33 which intersect projecting edge surface portion 23 along intersection line 25. As shown in Figure 1, the lower outer edge portions 33 may intersect the edge directors 22 at an elevation lying within the horizontal plane passing through the root 16.--

--Referring now to Figure 2, an edge director 22 is shown having a projecting edge surface portion 23 which extends the full heigh of the forming wedge in a vertical plane which intersects the longitudinal planes of the forming surfaces 14 and 15 at right angles. However, it is to be understood that if desired the plan of projecting edge surface portion 23 may be slightly inclined tc the vertical and/or askew to the forming surface portions. The web or filleted portion 24 is shown overlying an intersection 29 between the projecting edge portion 23 and inclined forming surfa 15. The web portion 24 is provided with a curvilinear surface which tangentially intersects the projecting edge surface portion 23 along line 25, and tangentially intersects the downwardly (continued)

UNITED STATES PATENT OFFICE
CERTIFICATE OF CORRECTION

Patent No. 3,537,834      Dated November 3, 1970

Inventor(s) Raphael A. Simon     PAGE - 2

It is certified that error appears in the above-identified patent and that said Letters Patent are hereby corrected as shown below:

(continued)
inclined forming surface 15 along diagonal line 26.--
--Unlike the lower outer edge portion 33 of Figure 1, which terminates at a level commensurate with the level of a plane passing through root 16, the outer edge portion 36 of the lower edge 30 of the web portion 24 shown in Figure 2 terminates at an elevation above the horizontal plane passing the root 16. In all other respects, however, the edge corrector device 22 shown in Figure 2 is similar to that shown in Figure 1.--
--Referring now to Figure 3 an edge director 22 having a projecting edge surface portion 23, similar to that shown in Figure 2, is provided with a web portion 24 having an outer lower edge portion 37 which terminates at its outer end with projecting edge surface portion 23 below a horizontal plane passing through root 16. In fact, as noted, the projecting edge surface portion 23 extends below the root or draw line 16.--
Column 4, line 6, "head" should read --bead--. Column 6, line 14, claim 6, "of said means" should read --of said web means--.

Signed and sealed this 4th day of May 1971.

(SEAL)
Attest:

EDWARD M. FLETCHER, JR.
Attesting Officer

WILLIAM E. SCHUYLER, JR.
Commissioner of Patents